United States Patent
Mader et al.

(10) Patent No.: US 10,689,208 B2
(45) Date of Patent: Jun. 23, 2020

(54) CONVEYING APPARATUS

(71) Applicant: LISEC AUSTRIA GMBH, Seitenstetten (AT)

(72) Inventors: Leopold Mader, Neuhofen/Ybbs (AT); Werner Holzknecht, Purgstall (AT)

(73) Assignee: LISEC AUSTRIA GMBH, Seitenstetten (AT)

( * ) Notice: Subject to any disclaimer, the term of this patent is extended or adjusted under 35 U.S.C. 154(b) by 0 days.

(21) Appl. No.: 16/308,072

(22) PCT Filed: Jun. 26, 2017

(86) PCT No.: PCT/EP2017/065678
§ 371 (c)(1),
(2) Date: Dec. 7, 2018

(87) PCT Pub. No.: WO2018/010942
PCT Pub. Date: Jan. 18, 2018

(65) Prior Publication Data
US 2019/0218042 A1    Jul. 18, 2019

(30) Foreign Application Priority Data
Jul. 12, 2016 (AT) ............... A 50620/2016

(51) Int. Cl.
*B65G 49/06* (2006.01)
*E06B 3/673* (2006.01)
(Continued)

(52) U.S. Cl.
CPC ......... *B65G 49/063* (2013.01); *B65G 1/023* (2013.01); *B65G 1/026* (2013.01); *B65G 1/06* (2013.01);
(Continued)

(58) Field of Classification Search
CPC ........ B65G 49/063; B65G 1/026; B65G 1/06; B65G 47/24; B65G 49/067; C03B 35/205
(Continued)

(56) References Cited

U.S. PATENT DOCUMENTS 4,094,659 A * 6/1978 Nixon ............... C03B 23/031
                                                        65/104
7,252,188 B2    8/2007 Lisec
(Continued)

FOREIGN PATENT DOCUMENTS

AT            354 934 B    2/1979
DE    10 2013 102431 A1    9/2014
(Continued)

OTHER PUBLICATIONS

International Search Report, dated Sep. 14, 2017, from corresponding PCT application No. PCT/EP2017/065678.

*Primary Examiner* — Gene O Crawford
*Assistant Examiner* — Lester Ill Rushin
(74) *Attorney, Agent, or Firm* — Young & Thompson

(57) ABSTRACT

Disclosed is an apparatus for conveying glass panels contains a conveying device including a feed conveyor and a removal conveyor, and also a region with a processing station. A lifting device for glass panels is provided upstream of the processing station and a lowering device for glass panels is provided downstream of the processing station, wherein a linear-conveying device is provided between the lifting device and the lowering device. It is thus possible for glass panels to be moved, by raising action, linear movement and lowering action, around a first component located in the region in the processing station, the second component therefore passing the first component. During the passing (Continued)

operation, the second component always remains in the conveying plane, which is the same as the plane of the second component.

20 Claims, 2 Drawing Sheets

(51) Int. Cl.
    *B65G 1/02*     (2006.01)
    *B65G 1/06*     (2006.01)
    *B65G 47/24*     (2006.01)
    *E06B 3/66*     (2006.01)

(52) U.S. Cl.
    CPC ........... *B65G 47/24* (2013.01); *B65G 49/067* (2013.01); *E06B 3/66* (2013.01); *E06B 3/67369* (2013.01); *B65G 2249/00* (2013.01); *B65G 2249/04* (2013.01)

(58) Field of Classification Search
    USPC ... 198/346.2, 346.3, 347.2, 456, 457, 463.3, 198/375, 617, 678.1, 680
    See application file for complete search history.

(56) References Cited

U.S. PATENT DOCUMENTS

| | | |
|---|---|---|
| 2015/0007433 A1 | 1/2015 | Lenhardt |
| 2016/0290034 A1 | 10/2016 | Lenhardt |

FOREIGN PATENT DOCUMENTS

| | | | | |
|---|---|---|---|---|
| EP | 0 727 556 A2 | 8/1996 | | |
| EP | 2 802 727 A1 | 11/2014 | | |
| EP | 2 964 863 A1 | 1/2016 | | |
| EP | 2 964 863 B1 | 8/2016 | | |
| EP | 2 802 727 B1 | 12/2016 | | |
| JP | 2003-192127 A | 7/2003 | | |
| JP | 2003192127 | * | 7/2003 | ............ B65G 49/06 |
| WO | 2004/048284 A1 | 6/2004 | | |
| WO | 2013/104542 A1 | 7/2013 | | |
| WO | 2015/090613 A1 | 6/2015 | | |

* cited by examiner

CONVEYING APPARATUS

BACKGROUND OF THE INVENTION

Field of the Invention

The invention relates to an apparatus for conveying tabular or panel-shaped components, in particular flat glass panes.

Description of the Related Art

Often, a problem arises when individual or multiple panel-shaped components, such as panes of glass, must be processed from components transported in succession; conversely, other components of the components that have been transported in succession can be further transported without processing. Due to the time expenditure of the processing—for example the positioning of spacer frames, the application of plastic spacers and/or the squaring of the edges of glass panes in the production of insulating glass—the components (glass panes) that are not to be processed must wait until the processing step on the individual component (glass pane) is ended.

To solve this problem, in the production of insulating glass, it has already been suggested that the glass panes be shifted out of the transport plane transversely to its surface extension, therefore transversely to the transport plane, and thus transported in a further second conveying cycle located parallel to the first conveying cycle, such that they overtake the glass pane that is to be processed (cf. EP 0 727 556 A2).

AT 354 934 B discloses in the assembly of insulating glass panes the lifting of individual glass panes transversely to their plane out of the plane of the conveyor track into a position in which a spacer can be mounted, so that the conveyor track is not blocked.

EP 2 964 863 A1 and EP 2 802 727 A1 disclose conveying devices for glass panes that have rotating system parts that can also be designed as buffer storages in order to move glass panes out of the conveyer track. EP 2 802 727 A1 also shows an apparatus for lifting glass panes upstream from the rotating intermediate station out of the conveying plane transversely to their flat extension.

The shifting of panel-shaped components, in particular of panes of glass, out of the conveying plane, even if the conveying plane is essentially vertical, constitutes a not inconsiderable effort because in addition to the first conveying plane, a second conveying plane with lateral support and conveying means on the lower edge of the latter is necessary.

JP 2003192127 A discloses an arrangement for conveying panel-shaped articles, such as flat glass, the conveying devices being set up for transport of flat glass in the position tilted to vertical. FIG. 9 shows an overall system that is described in Section [0031]. The system comprises several processing stations and washing stations. The processing stations are located in an upper part of the system, and the washing stations are located in a lower part of the system. The processing stations are supplied with flat glass by lifting devices. In the arrangement that is known from JP 2003192127 A, flat glass that has been lifted by a lifting device is not moved onward in the direction of the conveyor. Rather, the flat glass is moved down again to the pertinent conveyor.

WO 2004/048284 A1 shows the lifting of a glass panel by a conveying device. In any case, the glass panel in the "lower position" is not processed. In contrast, a glass panel will only be processed after it has been lifted off the linear conveyor and is being held by the lifting device.

BRIEF SUMMARY OF THE INVENTION

The object of the invention is to suggest an improved method that can be more easily executed and an apparatus that avoids the aforementioned problems.

In the method according to the invention and in the apparatus according to the invention proposed for executing the method, the advantage also arises that the time losses can be avoided that occur in the state of the art and that have occurred because further (second) components could not be transported onward, therefore had to wait, until a component that was to be processed has been completely processed. Thus, the cycle times can be improved.

With the method according to the invention, it is possible without losing time to change the sequence of delivered components, so that the components can be transported onward in a desired sequence.

With the method according to the invention and with the apparatus according to the invention, in the region in which components are stopped and optionally processed, not only one "first" component at a time, but even two or more than two components can be stopped. Likewise, in the method according to the invention and in the apparatus according to the invention, not only a "second" component, but also two or more than two components can be moved past at least one first component.

The term "stopped" used here also comprises a minor continued movement of the component at a slow or acceptable speed or even a movement of the component while it is being processed by a processing tool, this movement also being able to be carried out only during certain segments of processing. It is simply important that a component located in the upper conveying path is there (stationary or moving) until another component has been moved past in the lower conveying path.

The term "transport onward" used here comprises movements of the components, for example of the glass panes, in both directions.

In the invention, it can be provided that the components are conveyed (moved) by the conveying devices not only in the conveying direction or in an opposite direction, but can also be stopped, for example when they are to be processed.

In the invention, it has been considered that there be provided one, two or more than two second conveying paths in addition to the first conveying path, in which components are being moved by the apparatus. This at least one second conveying path is located above the first conveying path of the components.

Here, it can be provided that the components in the conveying paths can be moved at speeds that are independent of one another and can be stopped independently of one another. To do this, the conveying devices are designed and set up such that components in the conveying paths can be moved at speeds that are different from one another and can be stopped independently of one another.

It can be provided within the scope of the invention that there is at least one region in which components are being processed not only in the first (lower) conveying path, but also in at least one second (upper) conveying path. In this embodiment, it can be provided that the processing tool that is provided in the processing station is lifted out of at least one region located in the first conveying path into at least one region that is located in the second conveying path when a component that is located in the second conveying path is to be processed.

In one embodiment of the invention, there can be provided at least one processing tool at a time in the first conveying path, in the second conveying path, and in at least one further conveying path that is optionally provided.

To the extent the apparatus according to the invention for executing the method according to the invention is concerned, this object is achieved with an apparatus that has the features of the first apparatus claim.

Preferred and advantageous configurations of the method according to the invention and of the apparatus according to the invention are the subject matter of the dependent claims.

Since, in the method according to the invention, the panel-shaped component, in particular a pane of glass, when being removed from the conveying path remains in the conveying plane, therefore in the plane defined by the component, and is simply shifted in its plane, problems no longer arise when panel-shaped components such as panes of glass are being shifted transversely to their surface extension.

If the conveying plane is essentially vertical in the method according to the invention, as is conventional for production of insulating glass, the pane of glass that is to overtake a pane of glass that is to be processed can be lifted, remaining in the conveying plane above the glass pane to be processed, and after overtaking the pane of glass to be processed can still be lowered again while remaining in the conveying plane. To the extent the apparatus is concerned, there is a lifting apparatus for a component (pane of glass) that lifts the component (the pane of glass) up to a second conveying device that is located above the first conveying device and lowers it again after overtaking the component (pane of glass) to be processed with a second lifting device until it is on the first conveying device and can be transported onward.

In order to avoid difficulties in the raising or lowering of a component, in particular a pane of glass, it is preferably provided that the second conveying device is designed to be removable from the conveying plane, in particular to be retractable to the rear.

Within the scope of the invention, to a large extent any processing tools are considered. For example, tools for positioning of spacers for insulating glass and tools for seaming glass blanks. Providing different processing tools in the first conveying path and in at least one other conveying path in order to carry out different processing steps is also considered.

BRIEF DESCRIPTION OF THE DRAWINGS

Further details and features of the invention will become apparent from the following description of one preferred exemplary embodiment using the attached drawings.

DETAILED DESCRIPTION OF THE PREFERRED EMBODIMENTS

Figure 1:
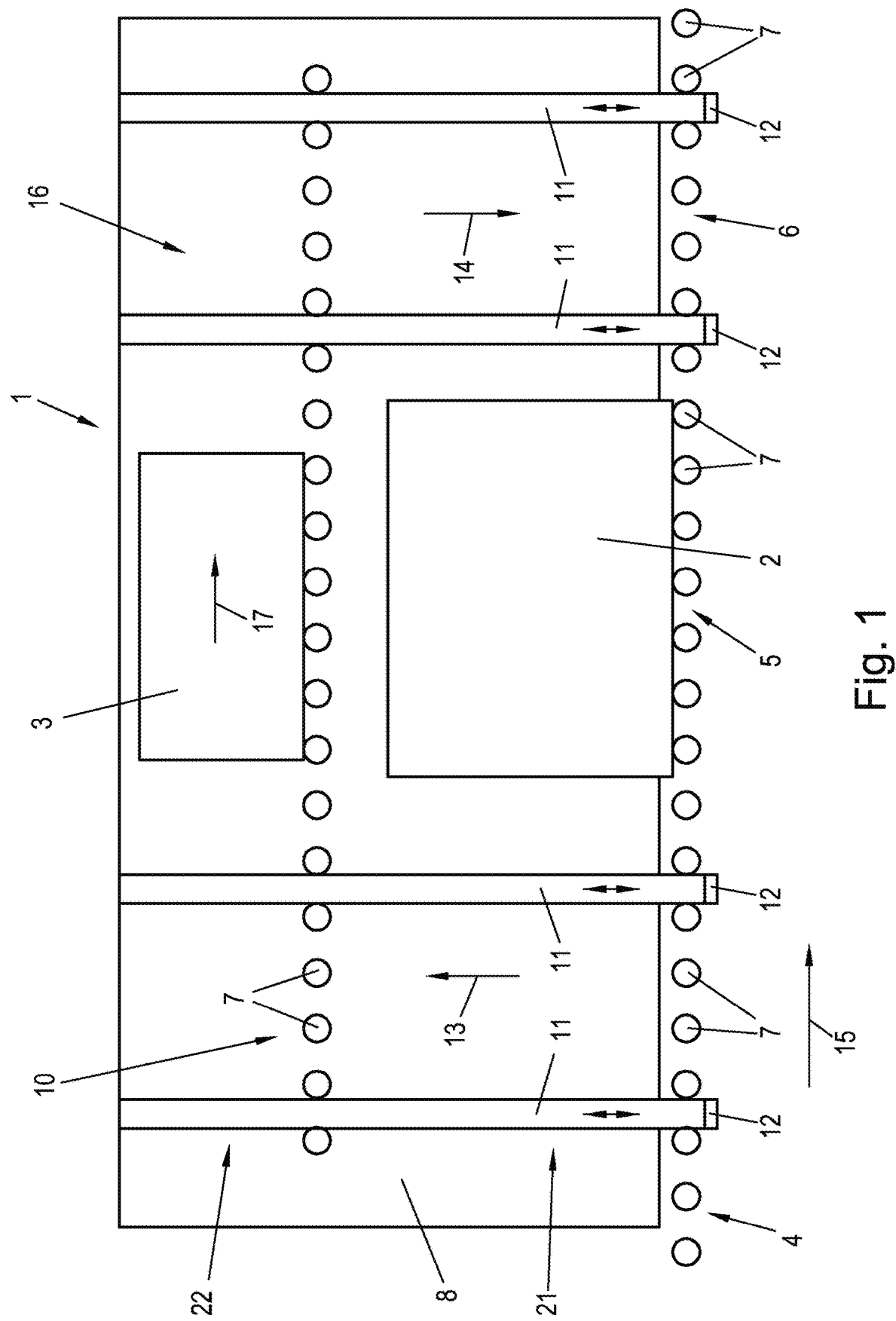
FIG. 1 schematically shows a device according to the invention for the transport of panes of glass and FIG. 2 shows an apparatus according to the invention.

An apparatus 1 for the transporting of panes 2, 3 of glass comprises a feed conveyor 4, a region 5 in which a glass pane 2 is to be processed, and a removal conveyor 6.

The processing station 20 that is located in the region 5 can be, for example, a station for the application of spacers, for positioning of spacer frames, or for squaring the edges of panes of glass.

Along the entire apparatus—therefore feed conveyor 4, region 5 with the processing station 20 and removal conveyor 6—there is a conveying means on which glass panes 2 are transported standing along a first conveying path 21 that is designed, for example, as conveying means with rollers 7, as conveying means with conveyor belts, or as combinations of these conveying means.

A supporting device 8, for example a support wall with air cushions or rollers on which the panes of glass 2 and 3 are transported leaning, extends upward from the conveying means.

In the region of the feed conveyor 4, there is a device 10 for lifting glass panes 3 to another conveying device 11. This device 10 for lifting can have, for example, two or more than two conveyor belts, on which members 12 that protrude over the support device 8, for example through slots in the support wall, are fastened. The members 12 seize a pane 2 of glass and lift it upward (arrow 13) by corresponding actuation so that it is lifted off the feed conveyor 4 into a second conveying path 22.

As soon as the pane 3 of glass has reached the desired height, the conveying means, for example rollers 7, of the other conveying device 11 ("upper conveying device") are moved out of their readiness position, in which they do not protrude over the support device, into their active position, i.e., advanced relative to the support device 8, and the pane 3 of glass is lowered onto the other upper conveying device 11.

By starting up the upper conveying device 11, the pane 3 of glass is moved past the region 5 as far as the removal conveyor 6 and is deposited there by another lifting device 16 after the conveying means of the upper conveyor device 11 is retracted to behind the support device 8 again onto the lower conveying device in the region of the removal conveyor 6 (arrow 14) and is transported out of the apparatus 1.

During this process in which a further pane 3 of glass overtakes a first pane 2 of glass that is located in the region 5 of the processing station 20, the first pane 2 of glass can be processed.

This method is especially advantageous in the production of insulating glass when the apparatus 1 according to the invention for transporting glass panes 2, 3 is located upstream from an assembly station that can also be designed as a gas filling press. Then, specifically, a first delivered pane 2 of glass can be covered with a spacer frame in region 5 or a plastic spacer is applied, while the second glass pane 3 that is then being combined with the first glass pane 2 provided with spacers to form an insulating glass blank is transported overtaking the first pane 2 of glass, so that it is the first to reach the assembly station or gas filling press and as is conventional in assembly stations and gas filling presses is kept moved out of the conveying plane until the first glass pane (with spacers) has been delivered.

Figure 2:
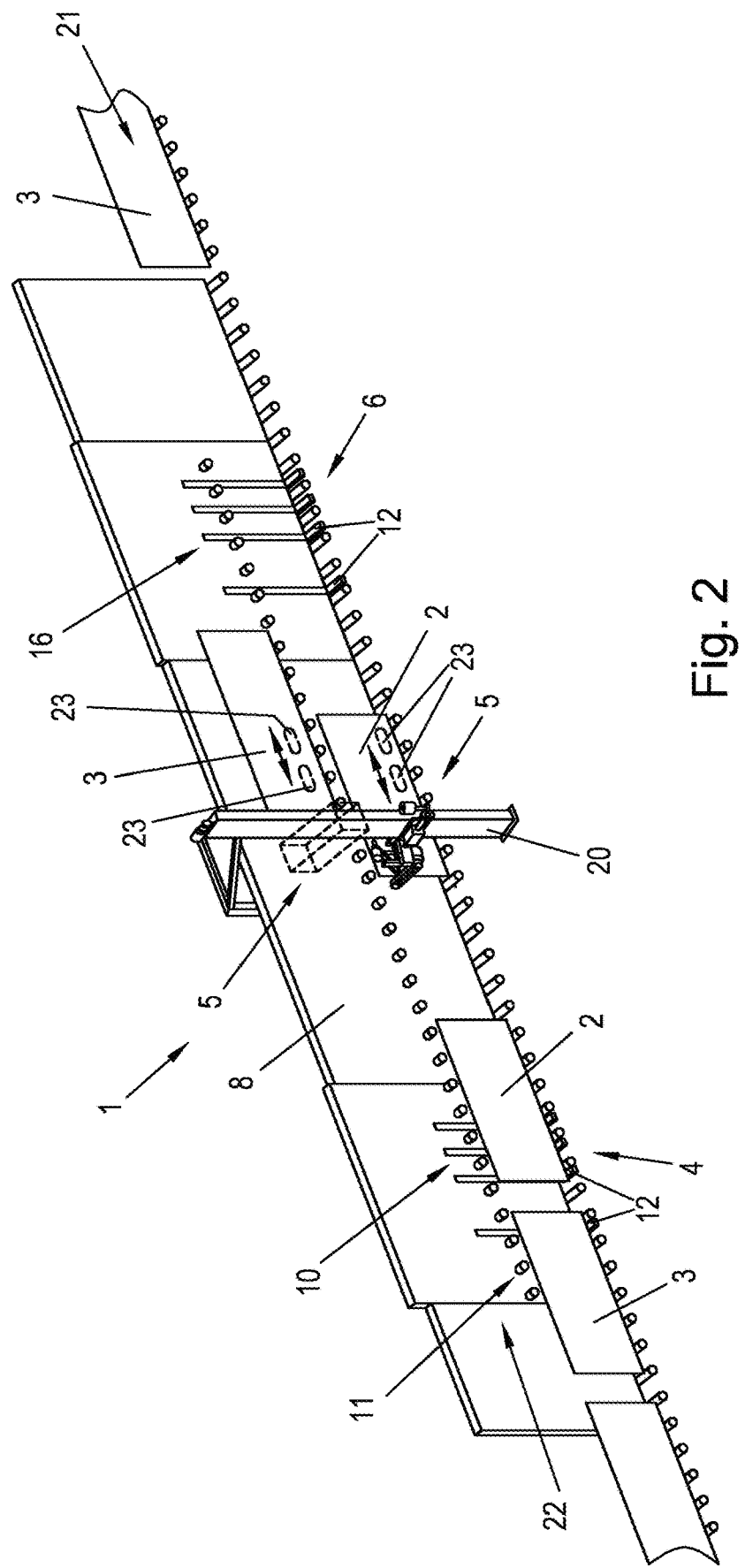

In the embodiment of a device 1 according to the invention that is shown in FIG. 2, the processing station 20 provided in the region 5 is designed as a device 20 for application of plastic spacers. In this region 5, for example, there can be drivers designed as suction heads 23 that support the movements of the pane 3 of glass when the spacers are being applied.

FIG. 2 shows that in the second upper conveying path 22, there can also be a region 5 in which a pane 3 of glass can be processed. In this case, it is provided that the processing tool (processing head), as indicated by the broken line in FIG. 2, can be moved up to such an extent that it can become active in the region 5 that is located in the second conveying path 22. Alternatively, there can be another processing tool in the region 5 that is provided in the second conveying path 22. For example, there can also be drivers designed as suction heads 23 in the upper region 5.

In the embodiment that is shown in FIG. 2, the lifting device 10 and the other lifting device 16 each comprise more than two conveyor belts with members 12 at a time, so that longer glass panes 3 can also be reliably lifted upstream from the region 5 and can be reliably lowered again downstream from the region 5.

With the device according to the invention, it also becomes possible for one pane 3 of glass above the removal conveyor 6, standing on the lifting members 12 of the lowering device 16 that is located downstream from the region 5 with the processing station in the second conveying path 22, to wait until a glass pane 2 that has been processed in the region 5 has been removed past it to a downstream apparatus. This can be the case in particular when the downstream apparatus is an assembly station for producing insulating glass blanks or a gas filling press, in which insulating glass blanks filled with a gas other than air are produced, and glass panes 2 and 3 that belong together are needed.

With the apparatus according to the invention, even large (taller) panes, therefore panes that extend into the upper conveying path, can be processed when the upper conveyor has been moved back out of the active position.

Moreover, it is possible to retrofit existing systems.

In summary, one exemplary embodiment of the invention can be described as follows:

In an apparatus 1 for conveying panes 2, 3 of glass, there is a conveying device comprising a feed conveyor 4 and a removal conveyor 6, as well as a region 5 with a processing station. Upstream from the processing station is a lifting device 10, and downstream from the processing station is a lowering device 16 for panes of glass, between the lifting device 10 and the lowering device 16 there being a linear conveying device 11. Thus, glass panes 3 can be moved around a first component standing in the region 5 in the processing station by lifting (arrow 13), linear movement (arrow 17) and lowering (arrow 14), so that the second component overtakes the first component. During the overtaking process, the second component remains continuously in the conveying plane that is identical to the plane of the second component.

The invention claimed is:

1. A method for conveying panel-shaped components, the method comprising:
   lifting panel-shaped components disposed in an essentially vertical conveying plane out of a first conveying path transversely to a conveying direction into at least one second conveying path; and
   lowering the lifted panel-shaped components transversely to the conveying direction into the first conveying path, wherein the panel-shaped components are moved in the conveying paths at speeds that differ from one another, and
   at least one of the components is processed in at least one region that is located in the first conveying path.

2. The method according to claim 1, wherein at least one first component of the panel-shaped components is stopped in one of the at least one regions and in which at least one second component of the panel-shaped components is moved past the at least one first component,
   wherein the at least one second component remaining in its plane and in the conveying plane is lifted transversely to the conveying direction, in which the second component is delivered out of the first conveying path into the second conveying path, the second component being moved past the first component that is stopped in the at least one region in the second conveying path, by the second component being conveyed beyond the at least one region in a direction parallel to the conveying direction, and
   wherein the second component is moved down downstream from the region again and is then removed.

3. The method according to claim 1, wherein the components are lifted into one of at least two second conveying paths.

4. The method according to claim 1, wherein the speeds at which the components are being moved are between standstill 0 m/min and 200 m/min.

5. The method according to claim 1, wherein the components are processed in the at least one region that is located in the at least one second conveying path.

6. The method according to claim 5, further comprising a processing tool configured to process one of the components that is located in the second conveying path is lifted out of the at least one region located in the first conveying path into another region that is located in the second conveying path.

7. An apparatus for executing the method according to claim 1, the apparatus comprising:
   a conveying device comprising a feed conveyor, the at least one region with a processing station, and a removal conveyor; and
   a support device that protrudes from the conveying device essentially vertically upward, the support device being relative to the conveying direction upstream from the region with the processing station is assigned a lifting device configured to lift second components and relative to the conveying direction downstream from the at least one region with the processing station is assigned a lowering device configured to lower the second components,
   wherein an upper conveying device is disposed between the lifting device and the lowering device.

8. The apparatus according to claim 7, wherein the upper conveying device is adjustable at least in regions thereof between an active position that protrudes above the support device and a readiness position behind the support device.

9. The apparatus according to claim 7, wherein the lifting device and the lowering device have members that engage the components.

10. The apparatus according to claim 9, wherein the members are configured to be raised or lowered by a movement system.

11. The apparatus according to claim 7, wherein the at least one second conveying path above the first conveying path.

12. The apparatus according to claim 11, wherein there is at least one region at a time in which one of the components is being processed in the first conveying path and in the second conveying path.

13. The apparatus according to claim 11, wherein the processing tool of the processing station is configured to be lifted into the region that is located in the second conveying path.

14. The apparatus according to claim 11, wherein at least one processing tool at a time is assigned to the region located in the first conveying path and to the region of the processing station that is located in the second conveying path.

15. The apparatus according to claim 7, wherein conveying systems of the feed conveyor, the removal conveyor, and the conveying device are configured at one or more of different speeds and in opposite directions to stop the components and to convey the components.

16. The apparatus according to claim 9, wherein the members are configured to be raised or lowered by conveyor belts.

17. The method according to claim 2, wherein the components are lifted into one of at least two second conveying paths.

18. The method according to claim 2, wherein the speeds at which the components are being moved are between standstill 0 m/min and 200 m/min.

19. The method according to claim 2, wherein the components are processed in the at least one region that is located in the at least one second conveying path.

20. A method for conveying panel-shaped components that are glass panels, the method comprising:
   stopping and, if applicable, processing at least one first component of the panel-shaped components in at least one region, and in which at least one second component is moved past the first component,
   wherein the panel-shaped components are lifted to remain in a substantially vertical conveying plane from a first conveying path transversely to a conveying direction into a second conveying path, and are lowered transversely to the conveying direction into the first conveying path,
   the panel-shaped components are moved in the conveying paths at speeds, which differ from one another,
   at least one of the panel-shaped components is processed in the at least one region, which is located in the first conveying path,
   the at least one second component is lifted, to remain in its plane and in the conveying plane from the first conveying path into the second conveying path transversely to the conveying direction, in which the at least one second component has been conveyed, and
   the second component is moved past the first component, which is stopped in the at least one region, in the second conveying path,
   the second component is conveyed across the at least one region in a direction, which is parallel to the conveying direction, and
   the second component is moved downwards again and is then conveyed away after the at least one region.

* * * * *